US011276984B2

(12) United States Patent
Tanaka (10) Patent No.: US 11,276,984 B2
(45) Date of Patent: Mar. 15, 2022

(54) METHOD OF CONTROLLING OPTICAL TRANSMITTER, AND OPTICAL TRANSMITTER

(71) Applicant: SUMITOMO ELECTRIC INDUSTRIES, LTD., Osaka (JP)

(72) Inventor: Yasuhiro Tanaka, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 578 days.

(21) Appl. No.: 16/191,031

(22) Filed: Nov. 14, 2018

(65) Prior Publication Data

US 2019/0148904 A1 May 16, 2019

(30) Foreign Application Priority Data

Nov. 16, 2017 (JP) .............................. JP2017-221226

(51) Int. Cl.
*H01S 3/067* (2006.01)
*H01S 3/10* (2006.01)
(Continued)

(52) U.S. Cl.
CPC ........ *H01S 3/06754* (2013.01); *H01S 3/0085* (2013.01); *H01S 3/1003* (2013.01);
(Continued)

(58) Field of Classification Search
CPC ............. H01S 3/06754; H01S 3/10015; H01S 3/1003; H04B 10/50; H04B 10/503;
(Continued)

(56) References Cited

U.S. PATENT DOCUMENTS

| 6,580,531 B1 * | 6/2003 | Swanson | .............. | H04B 10/504 |
| | | | | 398/158 |
| 2005/0089325 A1 | 4/2005 | Shan | | |

(Continued)

FOREIGN PATENT DOCUMENTS

| JP | H8-298486 | 11/1996 |
| JP | 2005-130492 | 5/2005 |

(Continued)

OTHER PUBLICATIONS

JPO Action dated Aug. 5, 2021.

*Primary Examiner* — Eric L Bolda
(74) *Attorney, Agent, or Firm* — Smith, Gambrell & Russell, LLP.

(57) ABSTRACT

A method of controlling an optical transmitter includes steps of amplifying, by an EDFA, a main signal output from an optical modulator, attenuating and outputting, by a VOA, the main signal amplified and output by the EDFA, and maintaining an output power of the main signal output from the VOA at a predetermined value, suspending the phase modulation in the optical modulator to output continuous wave light from the optical modulator, disabling feedback control of the VOA that is performed by the VOA controller and maintaining a constant control signal of the VOA, disabling feedback control of a pump laser that is performed by a pump laser controller, and controlling the pump laser to modulate an intensity of the excitation light and generate an auxiliary signal having a cycle longer than a cycle of the main signal.

8 Claims, 3 Drawing Sheets

(51) Int. Cl.
  *H01S 3/13* (2006.01)
  *H01S 3/00* (2006.01)
  *H01S 3/16* (2006.01)
  *H01S 3/094* (2006.01)

(52) U.S. Cl.
  CPC ...... *H01S 3/10015* (2013.01); *H01S 3/10038* (2013.01); *H01S 3/10053* (2013.01); *H01S 3/13013* (2019.08); *H01S 3/005* (2013.01); *H01S 3/094003* (2013.01); *H01S 3/1301* (2013.01); *H01S 3/1305* (2013.01); *H01S 3/1608* (2013.01)

(58) Field of Classification Search
  CPC .............. H04B 10/505; H04B 10/5057; H04B 10/54; H04B 10/564
  See application file for complete search history.

(56) References Cited

U.S. PATENT DOCUMENTS

2006/0257152 A1    11/2006  Koganei
2016/0103286 A1*   4/2016   Matsui ................ H01S 3/06754
                                                      398/139
2017/0212366 A1*   7/2017   Banno .................. H01S 3/0078

FOREIGN PATENT DOCUMENTS

| JP | 2006-319709 | 11/2006 |
| JP | 2011-146863 | 7/2011 |
| JP | 2017-130933 | 7/2017 |

\* cited by examiner

Fig.1

METHOD OF CONTROLLING OPTICAL TRANSMITTER, AND OPTICAL TRANSMITTER

TECHNICAL FIELD

An aspect of the present invention relates to a method of controlling an optical transmitter, and an optical transmitter.

BACKGROUND

Japanese Unexamined Patent Publication No. 2011-146863 discloses an optical transmitter that modulates communication data using a phase modulation scheme to generate an optical signal, and discloses a method of further modulating the generated optical signal using an intensity modulation scheme for superimposing a monitoring control signal to the optical signal. The intensity modulation is performed through modulation of a gain of an optical amplifier. A Mach Zehnder (MZ) type optical modulator configured of an InP compound semiconductor or a semiconductor material such as Si is more suitable for downsizing than one using Lithium niobite of the related art. However, a large insertion loss inherent in InP or Si needs an optical amplifier to be provided at a stage subsequent to the optical modulator for compensation. The optical amplifier is, for example, an erbium doped optical fiber amplifier (EDFA). In an optical transmitter introducing an EDFA, a scheme of superimposing the monitoring control signal an optical signal generated by a phase modulation scheme, for monitoring or controlling an optical fiber transmission system has not been studied specifically.

SUMMARY

In a method of controlling an optical transmitter according to an aspect of the present invention, an optical transmitter includes a wavelength tunable light source that outputs continuous wave light having a tunable wavelength, an optical modulator that outputs a main signal generated by phase modulation of the continuous wave light, a pump laser that outputs excitation light, an erbium-doped optical fiber amplifier (EDFA) that amplifies the main signal by using the excitation light, a variable optical attenuator (VOA) that has an amount of attenuation, attenuates the main signal amplified by the EDFA according to the amount of attenuation and outputs the attenuated main signal, a pump laser controller that performs feedback control of the pump laser so that an output power of the excitation light is kept close to a first set value, and a VOA controller that performs feedback control of the VOA so that an output power of the main signal output from the VOA is kept close to a second set value, and the method of controlling an optical transmitter includes: amplifying, by the EDFA, the main signal output from the optical modulator, attenuating and outputting, by the VOA, the main signal amplified and output by the EDFA, and maintaining the output power of the main signal output from the VOA at a predetermined value; suspending the phase modulation in the optical modulator to output the continuous wave light from the optical modulator; disabling the feedback control of the VOA that is performed by the VOA controller and maintaining a constant control signal of the VOA; disabling the feedback control of the pump laser that is performed by the pump laser controller; and controlling the pump laser to modulate an intensity of the excitation light and generate an auxiliary signal having a cycle longer than a cycle of the main signal.

DETAILED DESCRIPTION

Embodiments

Hereinafter, a method of controlling an optical transmitter according to an embodiment will be described in detail with reference to the accompanying drawings. In the drawings, the same elements are denoted by the same reference numerals, and duplicate descriptions are omitted.

Figure 1:
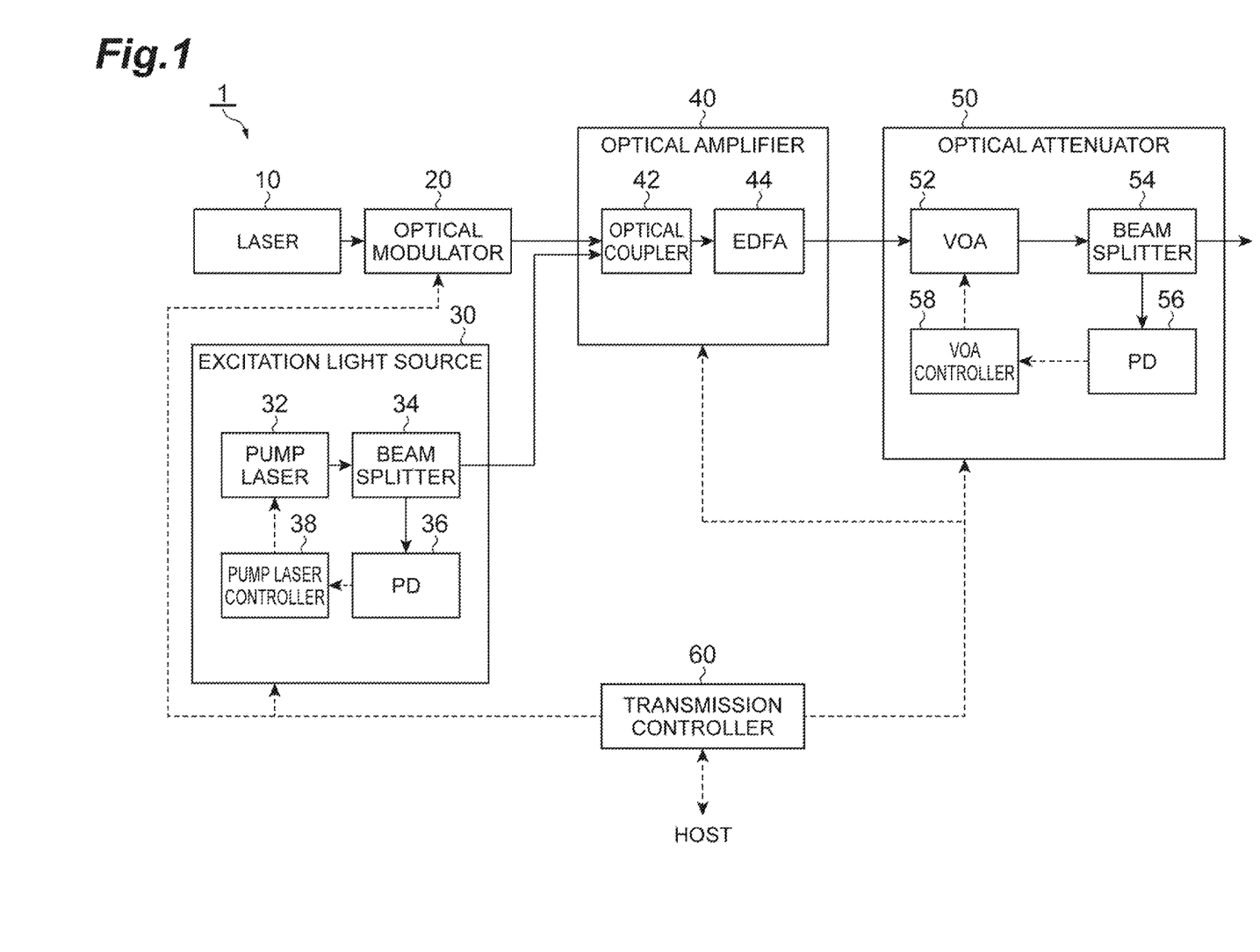
FIG. 1 is a diagram illustrating a schematic configuration of an optical transmitter that performs a control method according to an embodiment.

FIG. 1 is a diagram illustrating a schematic configuration of an optical transmitter that performs a control method according to the embodiment. In FIG. 1, solid arrows represent optical signals, and dashed arrows represent control signals. The control signals will be described below.

An optical transmitter 1 includes a laser (wavelength tunable light source) 10, an optical modulator 20, an excitation light source 30, an optical amplifier, 40, an optical attenuator 50, and a transmission controller 60.

The laser 10 is, for example, a wavelength tunable laser in which a peak wavelength of laser light to be output is tunable. The laser light (CW light: Continuous Wave light) generated by the laser 10 is sent to the optical modulator 20 through an optical waveguide, for example an optical fiber.

The optical modulator 20 performs phase modulation on the laser light output from the laser 10 in accordance with first transmission data to generate a main signal (phase-modulated optical signal). The first transmission data is data including communication data, and is provided to the optical transmitter 1 from an external host system (transmission apparatus) or the like. The main signal is a high-speed optical signal having a fundamental frequency component of several GHz to tens of GHz, for example. Since the laser 10 is a wavelength tunable laser as described above, the optical transmitter 1 can also be used for a wavelength division multiplexing (WDM) system or the like. In this case, the optical modulator 20 functions as an optical modulator that phase-modulates laser light of a channel selected from a plurality of channels (wavelengths). An example of the optical modulator 20 is an MZ modulator formed of a semiconductor material. The main signal generated by the optical modulator 20 is sent to an optical amplifier 40 through an optical waveguide, for example an optical fiber.

An excitation light source 30 generates excitation light and supplies the excitation light to the optical amplifier 40 through an optical waveguide, for example an optical fiber. The excitation light source 30 includes a pump laser 32, a beam splitter 34, a photo detector (PD) 36, and a pump laser controller 38. In the excitation light source 30, feedback control is performed so that an intensity (optical power) of the excitation light output by the excitation light source 30 is kept close to a constant value. Excitation light output from the pump laser 32 is sent to the outside of the excitation light source 30, that is, the optical amplifier 40, via the beam splitter 34. A portion of the excitation light is split by the beam splitter 34 and is converted into an electrical signal (a monitor signal) by the photo detector (PD) 36 for the feedback control. In other words, the beam splitter 34 splits a beam of the excitation light into two beams at a predetermined ratio (a split ratio). Since the split ratio is constant, it is possible to estimate an optical power of one of the two beams by obtaining an optical power of the other of the two beams. Thus, an intensity (an output power) of the excitation light output from the pump laser 32 is monitored. The pump laser controller 38 feeds back an estimated result (for example, a magnitude of the monitor signal) using the PD 36 and controls the pump laser 32 so that the output power of the excitation light of the excitation light source 30 is kept close to a target value (a power target value of the excitation light). This feedback control is performed, for example, by adjusting a set value which determines the output power of the pump laser 32. During the feedback control, the pump laser controller 38 provides a signal (a pump laser control signal) for adjusting the set value to the pump laser 32 at predetermined cycles, for example. The power target value of the excitation light is stored, for example, in an internal memory (not illustrated) of the pump laser controller 38. The configuration of the excitation light source 30 described above is an example, and the feedback control of the excitation light source 30 is not limited to such a configuration.

The optical amplifier 40 amplifies an optical signal input from the optical modulator 20 and outputs the amplified optical signal as output light. The optical amplifier 40 includes an optical coupler 42 and an EDFA 44. The optical coupler 42 combines the optical signal (the main signal) provided from the optical modulator 20 with the excitation light provided from the excitation light source 30 and outputs one combined optical signal. The optical coupler 42 is for example a wavelength selective coupler. A wavelength selective coupler can combine light of different wavelengths with small loss. The EDFA 44 amplifies the optical signal provided from the optical modulator 20 by passing the combined optical signal through an erbium doped fiber (EDF). That is, the EDFA 44 amplifies the main signal that is generated by the optical modulator 20 using the excitation light that is output by the excitation light source 30. The main signal amplified by the optical amplifier 40 is provided to the optical attenuator 50 through an optical waveguide, for example an optical fiber. The optical amplifier 40 may further include an optical isolator (not illustrated) in order to prevent light sent in a backward direction (return light) toward the input side (upstream) due to reflection of input light at an end surface of an optical system from being generated. That is, the optical coupler 42 may receive the optical signal input from the optical modulator 20 via an optical isolator and receive the excitation light of the excitation light source 30 via another optical isolator. It should be noted that these optical isolators may be provided at a stage subsequent to an output unit of the optical modulator 20 or the beam splitter 34 of the excitation light source 30 instead of being provided inside the optical amplifier 40. In addition, the optical amplifier 40 may include an ASE filter (not illustrated) for removing ASE noise. That is, the optical amplifier 40 may provide the main signal amplified by the EDFA 44 to the optical attenuator 50 via the ASE filter. Alternatively, the EDFA 44 may include such an ASE filter embedded in the output unit. In addition, the EDFA 44 may include a gain flattening filter (not illustrated) embedded therein in order to make a gain of the optical signal (a ratio of an output power to an input power of the EDFA 44) flat (constant) with respect to a wavelength of the optical signal.

The optical attenuator 50 is provided at a stage subsequent to the optical amplifier 40 (the EDFA 44) and is optically connected to the optical amplifier 40 through an optical waveguide, for example an optical fiber. The optical attenuator 50 attenuates output light (the main signal) provided from the optical amplifier 40. The optical attenuator 50 can adjust the amount of attenuation (for example, a ratio of an output power to an input power of the VOA 52) according to a VOA control signal to be described below. The optical attenuator 50 outputs output light (the main signal) attenuated according to the amount of attenuation. The optical attenuator 50 includes, for example, a VOA (Variable Optical Attenuator) 52, a beam splitter 54, a PD 56, and a VOA controller 58. In the optical attenuator 50, feedback control of the amount of attenuation of the VOA 52 is performed so that an optical power (intensity) of the optical signal (for example, the main signal amplified by the EDFA 44) becomes a desired value. The optical signal input to the optical attenuator 50 is attenuated by the VOA 52 and then output to the outside of the optical attenuator 50 via the beam splitter 54. This optical signal becomes an output signal (transmission signal) of the optical transmitter 1. A portion of the optical signal attenuated by the VOA 52 is split by the beam splitter 54 and converted into an electrical signal (a monitor signal) by the PD 56 for the feedback control. Accordingly, an intensity (output power) of the transmission signal of the optical transmitter 1 is monitored. The VOA controller 58 receives a detection result (for example, the magnitude of the monitor signal) of the PD 56 and adjusts the amount of attenuation of the VOA 52 so that an output power of the transmission signal of the optical transmitter 1 is kept equal or close to a target value (a target output power). This feedback control is performed, for example, by adjusting the set value which determines the amount of attenuation of the VOA 52. The VOA control signal is changed according to the set value, and the VOA controller 58 changes an attenuation rate according to the VOA control signal. When an optical signal having a constant intensity is input to the VOA 52, an intensity of the optical signal output from the VOA 52 decreases when the amount of attenuation of the VOA 52 is increased, and the intensity of the light signal output from the VOA 52 increases when the amount of attenuation of the VOA 52 is decreased. During the feedback control, the VOA controller 58 provides a signal (a VOA control signal) for adjusting the set value to the VOA 52 at predetermined cycles (or time intervals), for example. It should be noted that the target output power is stored in, for example, an internal memory (not illustrated) of the VOA controller 58. The configuration of the optical attenuator 50 described above is an example, and the feedback control of the output signal (transmission signal) is not limited to such a configuration.

The intensity (optical output power) of the transmission signal of the optical transmitter 1 can be maintained at a predetermined set value (target value) due to feedback control of the excitation light source 30 and the optical attenuator 50 described above. Such control is also referred to as automatic power control (APC). The APC is realized by cooperation of the pump laser controller 38 and the VOA controller 58. Thus, the pump laser controller 38 and the VOA controller 58 each function as a controller that performs feedback control of the excitation light source 30 and feedback control of the optical attenuator 50.

The transmission controller 60 performs overall control of the optical transmitter 1. The transmission controller 60 may have a communication interface for communicating with a device (host system) external to the optical transmitter 1. For example, the first transmission data used for generation of the main signal is sent from the host system to the transmission controller 60, and is further sent from the transmission controller 60 to the optical modulator 20. It should be noted that the first transmission data may be directly supplied from an external apparatus to the optical modulator 20 without passing through the transmission controller 60. Further, in either case, the first transmission data to be input to the optical modulator 20 is supplied to the optical modulator 20 via a drive circuit (not illustrated) that generates a driving signal suitable for driving the optical modulator 20.

The optical transmitter 1 having the above-described configuration can adjust an optical modulation signal (the main signal) generated by the optical modulator 20 to have a desired optical output power using the optical amplifier 40 and the optical attenuator 50, and then transmit the resultant optical modulation signal as a transmission signal.

A control method according to the embodiment is a method of transmitting an auxiliary signal different from the main signal using the optical transmitter 1. The auxiliary signal is a signal for monitoring or administrating a transmission system including, for example, the optical transmitter 1 and the host system. For example, the main signal includes communication data (for example voice signal, video signal, and digital signal), whereas the auxiliary signal includes monitoring and administration information for monitoring or administrating the transmission system. That is, a monitoring control signal as described in Japanese Unexamined Patent Publication No. 2011-146863 may also be included in the auxiliary signal. However, a type of auxiliary signal is not limited thereto. The main signal is a high-speed signal having a frequency of several GHz to tens of GHz, of which a phase has been modulated as described above, whereas the auxiliary signal is a low-speed signal having a frequency of, for example, about several Hz to several kHz, of which an intensity has been modulated. For example, as a time corresponding to one bit of data, the main signal generated by the phase modulation is tens of ps to hundreds of ps, whereas the auxiliary signal is hundreds of µs to hundreds of ms. The auxiliary signal is generated in accordance with second transmission data. An example of the second transmission data is bit data. The second transmission data is sent from the host system to the transmission controller 60. It should be noted that the second transmission data may be stored in a storage device (not illustrated) mounted inside the optical transmitter 1 in advance. In this case, for example, when a specific transmission instruction (command) has been received from the host system, the transmission controller 60 reads the second transmission data from the storage device and performs transmission. Further, since the auxiliary signal is transmitted to a wavelength multiplexing system through the host system, it is necessary for the auxiliary signal to have a tunable wavelength. The wavelength of the auxiliary signal is set by the laser (wavelength tunable light source) 10, similar to the main signal. The transmission controller 60 may determine the wavelength of the auxiliary signal.

The transmission controller 60, for example, is configured to communicate with other components of the optical transmitter 1 using a communication signal. Using the communication signal, the transmission controller 60 can perform various controls for transmitting the auxiliary signal. In the example illustrated in FIG. 1, the transmission controller 60 is configured to communicate with the optical modulator 20, the excitation light source 30, and the optical attenuator 50. For example, when each component includes an interface for serial communication such as an inter-IC bus (I²C) or a serial peripheral interface (SPI), the transmission controller 60 and the components are communicably connected to each other via such a serial communication bus. It should be noted that, here, the optical modulator 20 may include not only an MZ optical modulator, but also a peripheral circuit related to the optical modulator 20, such as a drive circuit (not illustrated) that generates a driving signal for modulating the MZ optical modulator or a bias circuit (not illustrated) that supplies a bias serving as a reference level of the driving signal. An example of control that is performed by the transmission controller 60 will be described below.

The transmission controller 60 can stop (suspend) and start (resume) the phase modulation (that is, the generation of the main signal) of the optical modulator 20. For example, the transmission controller 60 sends a command for stopping the phase modulation to the optical modulator 20 through signal lines, for example the serial communication bus as describe above. The optical modulator 20 stops (suspends) the phase modulation according to the command More specifically, for example, a drive circuit (not illustrated) that generates a driving signal for driving the optical modulator 20 in accordance with the first transmission data can stop the generation of the driving signal, thereby stopping the phase modulation of the optical modulator 20 by receiving a specific command from the transmission controller 60. Further, the transmission controller 60 sends a command for starting the phase modulation to the optical modulator 20. The optical modulator 20 starts (resumes) the phase modulation according to the command. More specifically, the modulation of the optical modulator 20 can be started, for example, by enabling the drive circuit described above to start the generation of the driving signal or to start supply of the bias to the above-described bias circuit. The transmission controller 60 may also transmit the first transmission data described above to the optical modulator 20. It should be noted that the wavelength of the auxiliary signal is set by the laser (wavelength tunable light source) 10, as described above. Therefore, even when the phase modulation is stopped in the optical modulator 20, the output is not shut off, but control is performed so that the CW light having predetermined output power is output from the optical modulator 20. The CW light output from the optical modulator 20 is used to generate the auxiliary signal.

The transmission controller 60 can disable and enable the feedback control of the excitation light source 30. For example, the transmission controller 60 sends, to the excitation light source 30, a command for suspending adjustment of the output of the pump laser 32 that is performed by the pump laser controller 38. According to the command, the pump laser controller 38 suspends the adjustment (that is, the feedback control) of the output power of the pump laser 32. Further, the transmission controller 60 sends, to the excitation light source 30, a command for resuming the adjustment of the output power of the pump laser 32 that is performed by the pump laser controller 38. According to the command, the pump laser controller 38 starts (resumes) the adjustment of the output power of the pump laser 32.

The transmission controller 60 can vary, for example, the output power of the excitation light of the excitation light source 30 by changing the set value of the intensity (output power) of the output light of the pump laser 32 described above. In this case, the transmission controller 60 generates the above-described pump laser control signal instead of the pump laser controller 38 and sends the pump laser control signal to the pump laser 32. According to the pump laser control signal, the output power of the pump laser 32 is varied. The pump laser control signal may be sent directly from the transmission controller 60 to the pump laser 32 or may be sent via the pump laser controller 38. Therefore, the control of the output power of the excitation light by the transmission controller 60 overrides the feedback control of the pump laser controller 38 for generating the auxiliary signal.

The transmission controller 60 can disable and enable the feedback control of the optical attenuator 50. For example, the transmission controller 60 sends, to the optical attenuator 50, a command for suspending adjustment of the amount of attenuation of the VOA 52 that is performed by the VOA controller 58. According to the command, the VOA controller 58 suspends the adjustment of the amount of attenuation (that is, the feedback control) of the VOA 52. Further, the transmission controller 60, to the optical attenuator 50, a command for resuming the adjustment of the amount of attenuation of the pump laser 32 that is performed by the VOA controller 58.

According to the command, the VOA controller 58 starts (resumes) the adjustment of the amount of attenuation of the VOA 52.

The transmission controller 60 can vary, for example, the amount of attenuation of the optical attenuator 50 by changing the set value determined for the amount of attenuation of the VOA 52 described above. In this case, the transmission controller 60 generates the above-described VOA control signal instead of the VOA controller 58 and sends the VOA control signal to the VOA 52. According to the VOA control signal, the amount of attenuation of the VOA 52 is varied. The VOA control signal may be sent directly from the transmission controller 60 to the VOA 52 or may be sent via the VOA controller 58. When the amount of attenuation of the VOA 52 is increased, the intensity (output power) of the optical signal output from the VOA 52 to the beam splitter 54 is decreased, and when the amount of attenuation of the VOA 52 is decreased, the intensity (output power) of the optical signal output from the VOA 52 to the beam splitter 54 is increased. For example, when the amount of attenuation of the VOA 52 is set to a maximum value with respect to a certain input power of the optical signal input to the VOA 52, the output power of the optical signal output from the VOA 52 has a minimum value. When the minimum value of the output power is smaller than a predetermined value, the output of the optical signal can be treated as being in a state in which the output of the optical signal is extinct (shut off) Therefore, the control of the amount of the attenuation by the transmission controller 60 overrides the feedback control of the VOA controller 58, when the optical transmitter 1 generates the auxiliary signal.

In addition, the transmission controller 60 may implement various functions. For example, the transmission controller 60 also has a timer function and an arithmetic function. The transmission controller 60 also includes an internal memory (storage device) for storing information necessary for the above-described process. The transmission controller 60 may be configured of, for example, a microcontroller, a complex programmable logic device (CPLD) or a field programmable gate array (FPGA). Further, the internal memory may be built in such a logic device, or may be prepared as a separate component and communicably connected to the logic device via a serial communication bus.

An embodiment of a method of transmitting an auxiliary signal using the optical transmitter 1 including the transmission controller 60 as described above will be described.

First Embodiment

Figure 2:
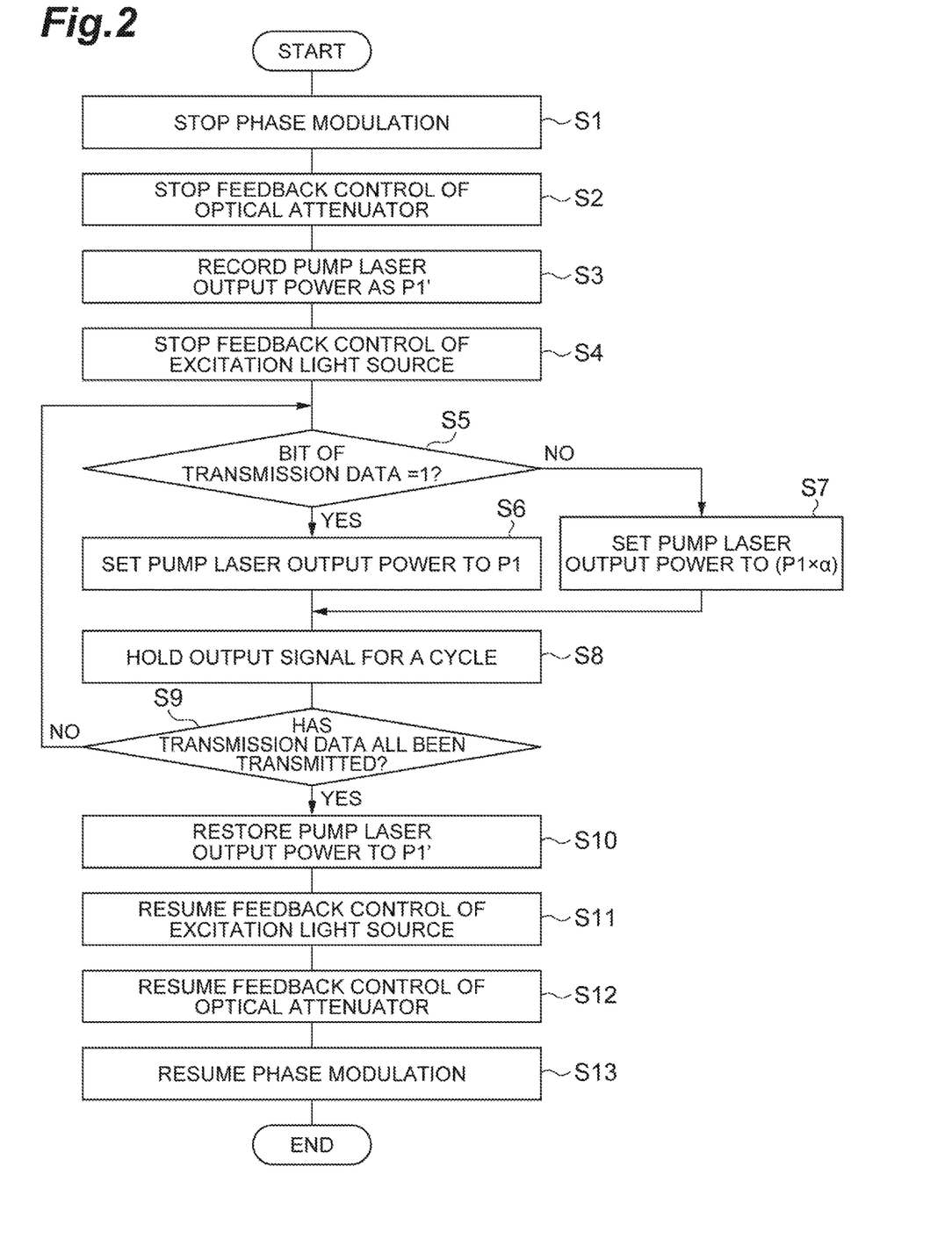
FIG. 2 is a flowchart illustrating an example of a process that is executed in a first embodiment.

FIG. 2 is a flowchart illustrating an example of control (a method of controlling an optical transmitter) that is executed in the optical transmitter 1 of FIG. 1. Each process of the flowchart is executed by the transmission controller 60 and is started, for example, in response to the transmission controller 60 having received, from the host system, a command to transmit the auxiliary signal. In this example, the process of the flowchart is started when the optical transmitter 1 (FIG. 1) is transmitting the main signal. Therefore, the optical modulator 20 generates the main signal by phase modulating the CW light having a tunable wavelength output from the laser (wavelength tunable light source) 10, and the feedback control of the excitation light source 30 and the optical attenuator 50 is performed. That is, the optical transmitter 1 is in a normal operation state in which the communication data is transmitted. Practically, the tunable wavelength is fixed to a specific wavelength depending on a configuration of the host system, for example according to an instruction to specify the wavelength (channel) from the host system.

In step S1, the transmission controller 60 makes the optical modulator 20 stop (suspend) the phase modulation. The processing to suspend the phase modulation of the optical modulator 20 is performed, for example, as described above. For example, the transmission controller 60 controls the drive circuit so that the drive circuit disables the driving signal output to the optical modulator. It should be noted that, even when the phase modulation is stopped, the CW light having the wavelength originated by the laser (wavelength tunable light source) 10 is output with a predetermined output power from the optical modulator 20, as described above.

In step S2, the transmission controller 60 stops (disables) the feedback control of the optical attenuator 50 that is performed by the VOA controller 58. In this case, the amount of attenuation of the VOA 52 is set so that an optical signal having a predetermined intensity is output from the VOA 52 to the beam splitter 54. It should be noted that when the feedback control is stopped, the VOA control signal is fixed to a fixed value and applied to the VOA 52. Accordingly, for example, an intensity (output power) of the light that is output from the VOA 52 may fluctuate while exceeding accuracy of the feedback control by the VOA control signal due to a fluctuation in a temperature of the optical transmitter 1 or a power supply voltage.

In step S3, the transmission controller 60 stores the set value indicated by the pump laser control signal in the internal memory of the transmission controller 60 as the set value P1'. This set value P1' is used to reproduce the output power of the excitation light source 30 when the feedback control of the excitation light source 30 is resumed by the pump laser controller 38. It should be noted that, when the output power for transmitting the auxiliary signal is different from the output power during the normal operation, a predetermined set value may be stored in the internal memory in advance and may be used.

In step S4, the transmission controller 60 stops (disables) the feedback control of the excitation light source 30 that is performed by the pump laser controller 38. The processing to suspend the feedback control of the pump laser controller 38 of the excitation light source 30 is performed, for example, as described above. For example, the transmission controller 60 controls the pump laser controller (pump laser drive circuit) 38 so that the pump laser controller 38 stops the pump laser 32 to oscillate.

In steps S5 to S9 to be described next, generation of the auxiliary signal in accordance with the second transmission data is performed. In this example, the second transmission data is bit data (binary data) having either level "0" or level "1" as a logical value. The transmission controller 60 controls the excitation light source 30 so that the intensity of the excitation light output from the excitation light source 30 sequentially varies in response to each bit of "0" or "1" starting from a head of the second transmission data, and generates an auxiliary signal of which an intensity has been modulated. Therefore, the auxiliary signal is generated by the pump laser 32 and is output to the beam splitter 34. In this case, the beam splitter 34 may split a portion of the output light output from the pump laser 32 and provide the portion to the PD 36. In addition, the PD 36 may convert the output light split from the beam splitter 34 into an electrical signal (monitor signal) for monitoring. However, the pump laser controller 38 fixes a set value of the output power of the auxiliary signal output from the excitation light source 30 at the value instructed by the transmission controller 60 regardless of the monitor signal. It should be noted that the auxiliary signal output from the pump laser 32 passes through the optical amplifier 40 and is transmitted to the outside of the optical transmitter 1 via the optical attenuator 50. In this time, for example, a set value of a gain of the optical amplifier 40 and a set value (VOA control signal) of the amount of attenuation of the optical attenuator 50 are maintained constant during the transmission of the auxiliary signal. Further, as described above, the CW light having a tunable wavelength is input from the optical modulator 20 to the optical amplifier 40, and this CW light is subjected to the intensity modulation with the auxiliary signal (excitation light) input from the excitation light source 30. Accordingly, the auxiliary signal that has a tunable wavelength and of which an intensity has been modulated with the second transmission data is output from the optical amplifier 40.

In step S5, the transmission controller 60 determines whether or not the logical value of the bit to be transmitted in the second transmission data is "1". When the logical value is "1" (step S5: YES), the transmission controller 60 proceeds to a process of step S6. When the logical value is not "1" (for example, "0") (step S5: NO), the transmission controller 60 proceeds to a process of step S7.

In step S6, the transmission controller 60 sets the set value of the pump laser control signal to the set value P1. This set value P1 may be the same as or smaller than the value of the set value P1' used during the normal operation described above. It should be noted that the set value P1 is set to, for example, a value equal to or larger than a lower limit value of the set value P1' determined for the normal operation. Therefore, the set value P1 is set between an upper limit value and the lower limit value of the set value P1' during the normal operation. The pump laser control signal is sent to the pump laser 32. Accordingly, the excitation light having the intensity corresponding to the set value P1 is output from the pump laser 32. After the process of step S6 is completed, the transmission controller 60 proceeds to a process of step S8. It should be noted that in a case in which the set value of the excitation light source 30 has already been the set value P1, the process of this step S6 may be omitted. That is, the transmission controller 60 simply holds the set value P1.

In step S7, the transmission controller 60 sets the set value indicated by the pump laser control signal to a value (P1×α) obtained by multiplying the set value P1 recorded in the previous step S3 by a predetermined magnification factor α. This pump laser control signal is sent to the pump laser 32. The magnification factor α is a value other than 1. More specifically, the magnification factor α is a value larger than 0 and smaller than 1. Accordingly, excitation light having the output power corresponding to the set value P1×α is output from the pump laser 32. The output power of this excitation light is set according to the output power corresponding to the set value P1 and the magnification factor α. After the process of step S7 is completed, the transmission controller 60 proceeds to a process of step S8. It should be noted that, in a case in which the set value of the excitation light source 30 has already been the set value P1×α, the process of step S7 may be omitted. That is, the transmission controller 60 simply holds the set value P1×α.

In step S8, the transmission controller 60 waits until a period (cycle) corresponding to one bit of the second transmission data has elapsed. A cycle corresponding to one bit of the second transmission data is, for example, about tens of μs to hundreds of ms, and for this time, the transmission controller 60 waits for processing, because the cycle of the auxiliary signal is much longer than that (tens of ps to hundreds of ps) of the optical signal in the normal operation mode. A timer function may be used for waiting. For example, the timer function is initialized at starting the process of S5, and triggers proceeding from the process of step S8 to the process of step S9 at the cycle. Accordingly, the pump laser 32 continues to output the excitation light having the output power corresponding to the set value P1 set in the previous step S6 or the set value P1×α set in step S7. It should be noted that a value of the cycle corresponding to one bit may be stored in the internal memory in advance before transmission of the auxiliary signal starts or may be provided from the host system.

In step S9, the transmission controller 60 determines whether or not the second transmission data has all been transmitted. When all the data has been transmitted (step S9: YES), the transmission controller 60 proceeds to a process of step S10. Otherwise (step S9: NO), the transmission controller 60 returns the process of step S5 again. The processes of steps S5 to S9 are repeatedly executed and the auxiliary signal based on the second transmission data is generated. More specifically, the transmission controller 60 processes the first bit to the last bit of the second transmission data bit by bit. Accordingly, optical signals corresponding to one bit of which intensities are different according to a logical value of each bit are output at regular intervals. That is, when the logical value is "1", an optical signal having an intensity (optical power) corresponding to the set value P1 is output, and when the logical value is "0", an optical signal having an intensity (optical power) corresponding to the set value P1×α is output. Since the set value P is larger than the set value P1×α, an optical signal of which an intensity (optical power) varies between two values according to a bit arrangement is output. Thus, the optical signal (auxiliary signal) of which the intensity has been modulated according to the second transmission data is output in steps S5 to S9. A waveform of the auxiliary signal is a waveform of which a level "1" and a level "0" are alternate, but the set value P1 corresponds to level "1" and the set value P1×α corresponds to level "0". The auxiliary signal generated by modulating the intensity of the excitation light of the pump laser 32 is transmitted as a transmission signal of the optical transmitter 1 via the optical amplifier 40 and the optical attenuator 50. By setting each of the gain of the optical amplifier 40 and the amount of attenuation of the optical attenuator 50 to a constant value, an optical signal of which the intensity of the optical output power has been modulated according to the second transmission data is output from the optical transmitter 1.

Incidentally, in the method of generating the auxiliary signal described above, a set value of the output power corresponding to a logical value "1" is set as P1, and a set value of the output power corresponding to a logical value "0" is set as P1×α. However, the set value of the output power corresponding to the logical value "0" can also be, for example, a value P0 that is not related to P1. In the pump laser 32, an actual output power may fluctuate from the set value with respect to the pump laser control signal set to be constant due to an individual difference in characteristics. In such a case, when correction for P1 is performed with respect to the logical value "1", the correction for P1 is reflected by setting P1×α with respect to the logical value "0", and therefore, correction with respect to the logical value "0" can be omitted. That is, when the independent set values of amounts of attenuation such as P1 and P0 are used, respective corrections are necessary with respect to the individual difference of the pump laser 32. The correction can be reduced to one time by setting the two set values to P1 and P1×α. This is based on the nature that the deviation of the actual output power from the set value due to the individual difference of the pump laser 32 deviates in the same direction irrespective of the magnitude of the output power. For example, when an actual value of the output power set by the set value P1 is larger than P1, an actual value of the output power set by the set value P1×α likely also becomes larger than P1×α.

In step S10, the transmission controller 60 sets the set value indicated by the pump laser control signal to the set value P1' recorded in the previous step S3. This pump laser control signal is sent to the pump laser 32. Accordingly, the excitation light of the output power corresponding to the set value P1' is output from the pump laser 32. It should be noted that, in a case in which the set value (for example, P1 described above) of the excitation light source 30 has already been equal to the set value P1', the process of step S10 may be omitted. That is, the transmission controller 60 simply holds the set value P1×α.

In step S11, the transmission controller 60 resumes the feedback control of the excitation light source 30 that is performed by the pump laser controller 38. For example, the transmission controller 60 sends a command to instruct start (resumption) of the feedback control of the excitation light source 30 to the pump laser controller 38. The pump laser controller 38 receiving the command resumes the feedback control of the excitation light source 30.

In step S12, the transmission controller 60 resumes the feedback control of the optical attenuator 50 that is performed by the VOA controller 58. For example, the transmission controller 60 sends a command to instruct start (resumption) of the feedback control of the VOA 52 to the VOA controller 58. The VOA controller 58 receiving the command resumes the feedback control of the VOA 52.

In step S13, the transmission controller 60 resumes the phase modulation of the optical modulator 20. Accordingly, the optical transmitter 1 returns to an initial state (a state of the normal operation before step S1). For example, the transmission controller 60 sends a command to instruct the above-described drive circuit to start (resume) generation of a driving signal and a command to instruct the above-described bias circuit to start (resume) supply of a bias to the respective circuits, thereby resuming the modulation of the optical modulator 20.

After the process of step S13 is completed, the transmission controller 60 ends the process of the flowchart. Accordingly, the optical transmitter 1 performs the normal operation for transmitting the optical signal phase-modulated in accordance with the communication data.

The order of each step may be appropriately changed. For example, an order of execution may be reversed between the process of steps S2 and S3 and the process of step S4. An order of execution may be reversed between the process of step S11 and the process of step S12.

According to the procedure of the flow chart illustrated in FIG. 2 (the method of controlling the optical transmitter), the feedback control of the optical attenuator 50 and the feedback control (APC) of the excitation light source 30 are disabled (steps S2 and S4). Therefore, the automatic control of the output power of the transmission signal of the transmitter 1 is released. The excitation light source 30 is controlled by the transmission controller 60, and the intensity of the excitation light is modulated (steps S5 to S9) in accordance with the second transmission data, thereby generating the auxiliary signal. Thus, the auxiliary signal can be transmitted using the optical transmitter 1 including the EDFA 44.

The output power of the excitation light of which the intensity has been modulated in steps S5 to S9 may have a first output power (an output power corresponding to the set value P1 in step S6) and a second output power (an output power corresponding to the set value P1×α in step S7). The first output power may be set to an output power P1' of the excitation light when the feedback control of the excitation light source 30 is being performed by the pump laser controller 38 or may be set to a value smaller than P1'. The second output power may be set to an output power obtained by multiplying the first level by a predetermined magnification factor α (an output power lower than the first output power). Accordingly, intensity modulation using the first output power and the second output power can be performed. The auxiliary signal has a pulse waveform where the peak level is determined by the set value P1 and the bottom level is determined by the P1×α. Here, the first output power level is set to a value equal to or smaller than the output power of the excitation light when the feedback control of the excitation light source 30 is performed. Since the output power of this excitation light has a magnitude suitable for the operation of the optical transmitter 1, the first output power can be appropriately set. Since the second output power is smaller than the first level, the second level can also be appropriately set. It should be noted that the auxiliary signal output from the pump laser 32 passes through the beam splitter 34, is amplified by the optical amplifier 40, is attenuated by the optical attenuator 50, and is transmitted to the outside. In a case in which a gain of the optical amplifier 40 and an amount of attenuation of the optical attenuator 50 are different from those in the normal operation mode when the auxiliary signal is transmitted, the first output power and the second output power may be set in consideration of such a difference.

Further, when the phase modulation of the optical modulator 20 is stopped and the generation of the main signal is stopped (step S1), the optical transmitter 1 can transmit only the auxiliary signal instead of the optical signal generated in the normal operation mode.

Second Embodiment

Figure 3:
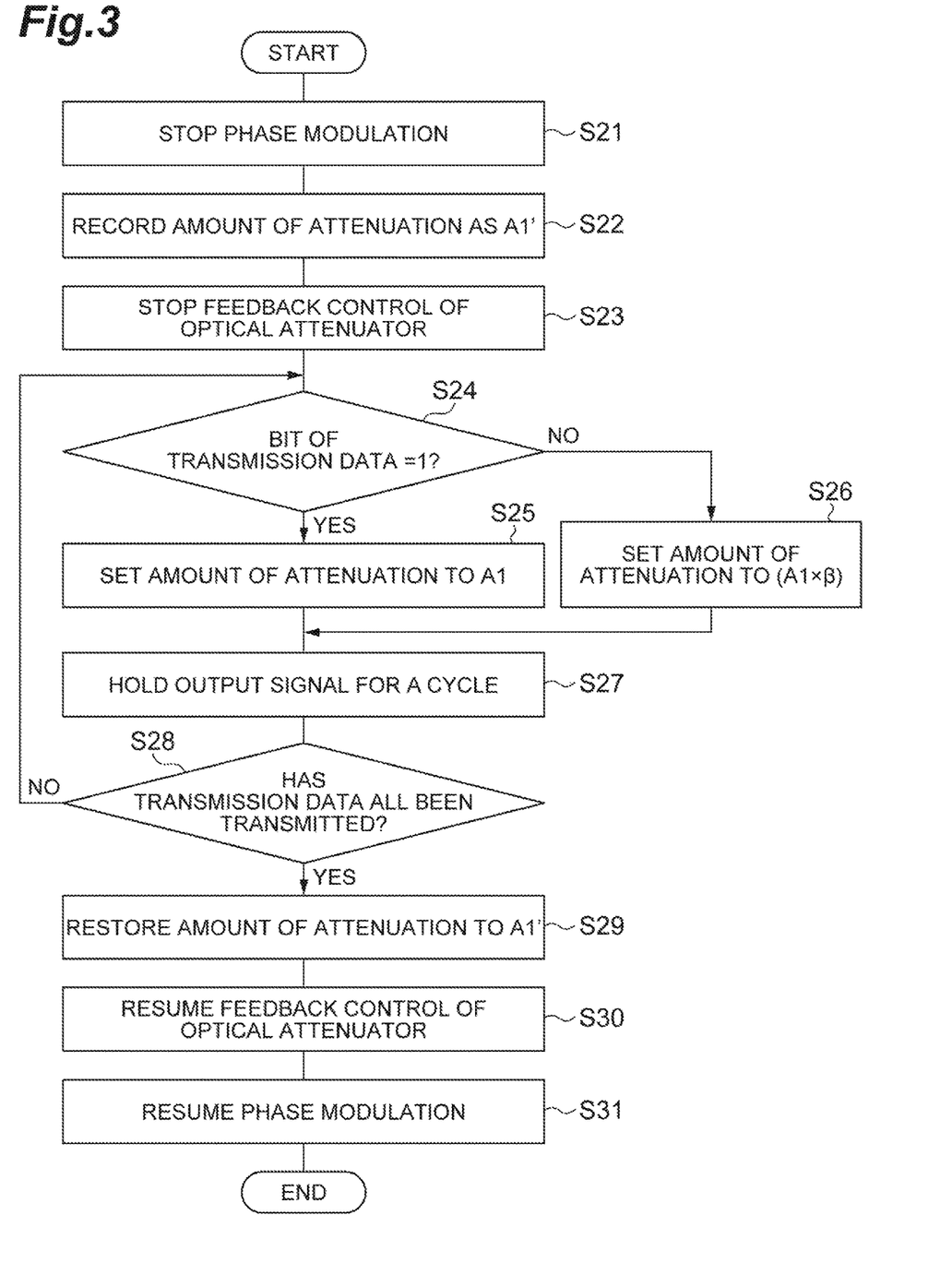
FIG. 3 is a flowchart illustrating an example of a process that is executed in a second embodiment.

FIG. 3 is a flowchart illustrating another example of control (optical transmitter control method) that is executed in the optical transmitter 1 of FIG. 1.

The process of step S21 is the same as the process of step S1 described above with reference to FIG. 2. The transmission controller 60 stops (suspends) the phase modulation. It should be noted that, in order to generate the auxiliary signal having a tunable wavelength, setting is performed so that the CW light having a tunable wavelength is output from the laser (wavelength tunable light source) 10, and the CW light is output with a predetermined output power from the optical modulator 20. Therefore, although the phase modulation is stopped, control is performed so that the CW light having a tunable wavelength is output without the output of the optical modulator 20 being shut off.

In step S22, the transmission controller 60 stores the set value of the VOA control signal in the internal memory of the transmission controller 60 as the set value A1'. This set value A1' is used to reproduce the amount of attenuation of the optical attenuator 50 when feedback control of the optical attenuator 50 is being resumed by the VOA controller 58.

The process of step S23 is the same as the process of step S2 described above with reference to FIG. 2. The transmission controller 60 disables the feedback control of the optical attenuator 50.

In steps S24 to S28 to be described next, the generation of the auxiliary signal in accordance with the second transmission data is performed. In this example, the VOA 52 is controlled so that the amount of attenuation of the VOA 52 is sequentially varied according to a logical value "0" or "1" of each bit of the second transmission data and the intensity (the output power) of the output light of the optical amplifier 40 is changed between two levels, thereby generating the auxiliary signal of which the intensity has been modulated. It should be noted that, in this case, it is assumed that an input power of the light input to the VOA 52 is fixed at a predetermined value. For example, a setting is performed so that the CW light having a tunable wavelength is input from the optical modulator 20 to the optical amplifier 40, and excitation light having a predetermined output power is input from the excitation light source 30 to the optical amplifier 40. Accordingly, the CW light having a tunable wavelength and having a predetermined output power is output from the optical amplifier 40.

A process of step S24 is the same as the process of step S5 described with reference to FIG. 2 above. When a logical value of a bit to be processed in the second transmission data is "1" (step S24: YES), the transmission controller 60 proceeds to a process of step S25, and when the logical value is not "1" (for example, "0") (step S24: NO), the process proceeds to step S26.

In step S25, the transmission controller 60 may set the set value A1 indicated by the VOA control signal to a value equal to or larger than the set value A1' recorded in the previous step S22. It should be noted that the set value A1 is set to a value smaller than an upper limit value of the set value A1' determined for the normal operation. That is, the set value A1 is set to a value between a lower limit value and the upper limit value of the set value A1' during the normal operation. This VOA control signal is sent to the VOA 52. Accordingly, the amount of attenuation of the VOA 52 becomes an amount of attenuation corresponding to the set value A1 (substantially equal to the amount of attenuation when the feedback control of the optical attenuator 50 is performed). As a result, the optical power of the light output from the optical modulator 20 is attenuated by the amount of attenuation corresponding to the set value A1 by the VOA 52. After the process of step S25 is completed, the transmission controller 60 proceeds to a process of step S27. It should be noted that, in a case in which the set value of the optical attenuator 50 has already been the set value A1, the process of this step S25 may be omitted. That is, the transmission controller 60 simply holds the set value A1.

In step S26, the transmission controller 60 sets the set value indicated by the VOA control signal to a value (A1×β) obtained by multiplying the set value A1 recorded in the previous step S22 by a magnification factor β. This VOA control signal is sent to the VOA 52. Accordingly, the amount of attenuation of the VOA 52 becomes the amount of attenuation corresponding to the set value A1×β. The magnification factor β is a value other than 1. More specifically, the magnification β is a value greater than 1. The magnification factor β may be, for example, a reciprocal (β=1/α) of the magnification factor α described above. Accordingly, the excitation light from the optical modulator 20 is attenuated by the amount of attenuation corresponding to the set value A1×β by the VOA 52. That is, this amount of attenuation is an amount of attenuation corresponding to the set value A1 and the magnification factor β. The intensity (output power) of the optical signal output from the VOA 52 is lower when the amount of attenuation is set to the set value A1×β (step S26) than when the amount of attenuation is set to the set value A1 (step S25). After the process of step S26 is completed, the transmission controller 60 proceeds to a process of step S27. It should be noted that in a case in which the set value has already been A1×β, the process of step S27 may be omitted. That is, the transmission controller 60 simply holds the set value A1×β.

Incidentally, in the method of generating the auxiliary signal, the set value of the amount of attenuation corresponding to the logical value "1" is set to A1, and the set value of the amount of attenuation corresponding to the logical value "0" is set to A1×β. However, the set value of the amount of attenuation corresponding to the logical value "0" can also be set to, for example, a value A0 that is not related to A1. Here, A0 is a value larger than A1. In the pump laser 32, an actual amount of attenuation may fluctuate (deviate) from the set value with respect to the VOA control signal that is set to be constant, due to an individual difference in characteristics. In such a case, when correction for A1 is performed with respect to the logical value "1", the correction for A1 is reflected by setting A1×β with respect to the logical value "0", and therefore, correction of the amount of attenuation with respect to the logical value "0" can be omitted. That is, when the independent set values of amounts of attenuation such as A1 and A0 are used, respective corrections are necessary with respect to the individual difference of the VOA 52. The correction can be reduced to one time by setting the two set values to A1 and A1×β. This is based on the nature that the deviation of the actual amount of attenuation from the set value due to the individual difference of the VOA 52 deviates in the same direction irrespective of a magnitude of the amount of attenuation. For example, when an actual value of the output power set by the set value A1 is larger than A1, an actual value of the output power set by the set value A1×β likely also becomes larger than A1×β.

The processes of step S27 and step S28 are the same as the processes of step S8 and step S9 described above with reference to FIG. 2. The transmission controller 60 waits until a period (cycle) corresponding to one bit of the second transmission data has elapsed (step S27). When all the second transmission data has been transmitted (step S28: YES), the transmission controller 60 proceeds to a process of step S29, and otherwise (step S28: NO), the transmission controller 60 returns to the process of step S24. By repeatedly executing the processes of steps S24 to S28, an auxiliary signal based on the second transmission data is generated. More specifically, the transmission controller 60 processes the first bit to the last bit constituting the second transmission data bit by bit. Accordingly, optical signals having different intensities according to the logical value of each bit are output at regular intervals. That is, when the logical value is "1," an optical signal attenuated according to an attenuation corresponding to the set value A1 is output, and when the logical value is "0", an optical signal attenuated by an attenuation corresponding to the set value A1×β is output. Since the set value A1 is smaller than the set value A1×β, an optical signal of which the intensity varies between two values according to a bit arrangement is output. Thus, the optical signal (auxiliary signal) of which the intensity has been modulated according to the second transmission data is output by steps S5 to S9. The auxiliary signal generated by changing the amount of attenuation of the VOA 52 and thereby modulating of the intensity of the output light of the optical amplifier 40 is transmitted as the transmission signal of the optical transmitter 1.

In step S29, the transmission controller 60 sets the set value indicated by the VOA control signal to the set value A1' recorded in the previous step S22. This VOA control signal is sent to the VOA 52. Accordingly, the amount of attenuation of the VOA 52 becomes the amount of attenuation corresponding to the set value A1'. It should be noted that, in a case in which the set value of the optical attenuator 50 has already been the same value as the set value A1', the process of step S29 may be omitted. That is, the transmission controller 60 simply holds the same set value as A1'.

Processes of steps S30 and S31 are the same as the process of steps S12 and S13 described above with reference to FIG. 2. The transmission controller 60 resumes the feedback control of the optical attenuator 50 and resumes the phase modulation of the optical modulator 20. Accordingly, the optical transmitter 1 returns to the initial state (a state of the normal operation before step S21).

After the process of step S31 is completed, the transmission controller 60 ends the procedure of the flowchart.

It should be noted that the order of each step may be appropriately changed. For example, the order of execution may be reversed between the process of step S30 and the process of step S31.

According to the procedure of the flow chart illustrated in FIG. 3 (the method of controlling the optical transmitter), the feedback control of the optical attenuator 50 is disabled (step S23), and therefore, automatic control (APC) of the output power of the transmission signal of the optical transmitter 1 is released. The VOA 52 is controlled by the transmission controller 60 so that the amount of attenuation of the VOA 52 is changed, and the intensity of the output light of the EDFA 44 is modulated in accordance with the second transmission data, thereby generating the auxiliary signal (steps S24 to S28). Thus, it is also possible to transmit the auxiliary signal using the optical transmitter 1 including the EDFA 44.

The amount of attenuation of the VOA 52 varied in steps S24 to S28 is set to the first amount of attenuation (the amount of attenuation corresponding to the set value A1 in step S25) or the second amount of attenuation (the amount of attenuation corresponding to the set value A1×β in step S26). The first amount of attenuation may be set to a value substantially equal to or larger than the amount of attenuation when the feedback control of the optical attenuator 50 is performed by the VOA controller 58 during the normal operation, and the second amount of attenuation may be set to an amount of attenuation obtained by multiplying the first amount of attenuation by a predetermined magnification factor (the amount of attenuation larger than the first amount of attenuation). Accordingly, intensity modulation using the first amount of attenuation and the second amount of attenuation can be performed. Here, the first amount of attenuation is set to a value approximately equal to or greater than the amount of attenuation of the optical attenuator when the feedback control of the optical attenuator is performed. Since this amount of attenuation has a magnitude suitable for the operation of the optical transmitter 1, it is possible to appropriately set the first amount of attenuation. For example, the output power generated by the first amount of attenuation never exceeds an upper limit of the output power determined for the normal operation. Since the second amount of attenuation is set to be larger than the first amount of attenuation, the second amount of attenuation can also be appropriately set.

Further, when the phase modulation of the optical modulator 20 is stopped and the generation of the main signal is stopped (step S21), only the auxiliary signal can be transmitted.

Although the embodiments of the present invention have been described above, the present invention is not limited to the embodiments.

For example, an example in which, in the configuration illustrated in FIG. 1, the pump laser controller 38 in the excitation light source 30 performs the feedback control by adjusting the output of the pump laser 32, and the VOA controller 58 in the optical attenuator 50 performs the feedback control by adjusting the amount of attenuation of the VOA 52 has been described. However, the functions of the pump laser controller 38 and the VOA controller 58 may be included in the transmission controller 60.

What is claimed is:

1. A method of controlling an optical transmitter to generate a main signal having an output power at a predetermined value, and to generate an auxiliary signal, the optical transmitter including a wavelength tunable light source that outputs continuous wave light having a tunable wavelength, an optical modulator that outputs the main signal by phase modulation of the continuous wave light, a pump laser that outputs excitation light, an erbium-doped optical fiber amplifier (EDFA) that amplifies the main signal by using the excitation light, a variable optical attenuator (VOA) that attenuates the main signal amplified by the EDFA and outputs the attenuated main signal as the main signal generated by the optical amplifier, a pump laser controller that performs feedback control of the pump laser so that an output power of the excitation light is kept close to a first set value, and a VOA controller that performs feedback control of the VOA so that the output power of the attenuated main signal output from the VOA is kept close to a second set value, the method comprising:
controlling the optical transmitter while in normal mode operation to generate the main signal with the output power thereof set at the predetermined value by:
amplifying, by the EDFA, the main signal output from the optical modulator,
attenuating and outputting, by the VOA, the main signal amplified and output by the EDFA, and
maintaining the output power of the main signal output from the VOA at the predetermined value; and
controlling the optical transmitter while not in normal mode operation to generate the auxiliary signal by:
suspending phase modulation by the optical modulator so that the optical modulator outputs the continuous wave light from the wavelength tunable source;
disabling feedback control of the VOA performed by the VOA controller, and applying a constant control signal to the VOA;
disabling feedback control of the pump laser performed by the pump laser controller; and controlling the pump laser to modulate the optical power of the excitation light to generate the auxiliary signal, the auxiliary signal being a low speed signal relative to the main signal.

2. The method of controlling an optical transmitter according to claim 1, wherein
the auxiliary signal has a level of "1" and a level of "0," and
the method further comprises:
setting the level "1" between an upper limit value and a lower limit value of the output power of the excitation light when the feedback control of the pump laser is performed by the pump laser controller, and
setting the level "0" to be smaller than the level "1" and larger than zero.

3. A method of controlling an optical transmitter to generate a main signal having an output power at a predetermined value, and to generate an auxiliary signal, the optical transmitter including a wavelength tunable light source that outputs continuous wave light having a tunable wavelength, an optical modulator that outputs the main signal by phase modulation of the continuous wave light, a pump laser that outputs excitation light, an erbium-doped optical fiber amplifier (EDFA) that amplifies the main signal by using the excitation light, a variable optical attenuator (VOA) that attenuates the main signal amplified by the EDFA and outputs the attenuated main signal as the main signal generated by the optical transmitter, a pump laser controller that performs feedback control of the pump laser so that an output power of the excitation light is kept close to a first set value, and a VOA controller that performs feedback control of the VOA so that the output power of the main signal output from the VOA is kept close to a second set value, the method comprising:
controlling the optical transmitter while in normal mode operation to generate the main signal with the output power thereof set at the predetermined value by:
amplifying, by the EDFA, the main signal output from the optical modulator,
attenuating and outputting, by the VOA, the main signal amplified and output by the EDFA, and
maintaining the output power of the main signal output from the VOA at the predetermined value; and
controlling the optical transmitter while not in normal mode operation to generate the auxiliary signal by:
suspending phase modulation in the optical modulator so that the optical modulator outputs the continuous wave light from the wavelength tunable light source;
setting the output power of the excitation light from the pump laser to a predetermined value; and
controlling the VOA to vary the attenuation by the VOA and modulating the output power of the output light of the EDFA to generate the auxiliary signal, the auxiliary signal being a low speed signal relative to the main signal.

4. The method of controlling an optical transmitter according to claim 3, wherein
the attenuation of the VOA varied in the step of generating the auxiliary signal is set to a first attenuation or a second attenuation,
the first attenuation is set between an upper limit value and a lower limit value of attenuation when feedback control of the VOA is performed by the VOA controller, and
the second attenuation is set to be larger than the first attenuation.

5. An optical transmitter comprising:
a wavelength tunable light source that outputs continuous wave light having a tunable wavelength;
an optical modulator;
a pump laser that outputs excitation light;
an erbium-doped optical fiber amplifier (EDFA) that amplifies light output from the optical modulator by using the excitation light;
a variable optical attenuator (VOA); and
a controller configured to control the wavelength tunable light source, the optical modulator, the pump laser, the EDFA, and the VOA to generate a main signal and an auxiliary signal,
the controller generating the main signal by:
causing the optical modulator to phase modulate the continuous wave light from the wavelength tunable light source and output phase-modulated light,
causing the EDFA to amplify the phase-modulated light from the optical modulator and output amplified light, and
causing the VOA to attenuate the amplified light from the EDFA and output attenuated light as the main signal, and
the controller generating the auxiliary signal by:
causing the optical modulator to suspend phase modulation whereby the optical modulator outputs the continuous wave light from the wavelength tunable light source,
causing the pump laser to output intensity modulated light as the excitation light,
causing the EDFA to amplify the continuous wave light from the optical modulator by use of the intensity modulated light from the pump laser to output amplified, intensity-modulated light, and
causing the VOA to attenuate the amplified, intensity-modulated light from the EDFA to output attenuated, intensity-modulated light as the auxiliary signal,
wherein the controller causes the pump laser to vary the intensity of the excitation light laser between a first set value and a second set value smaller than the first set value.

6. An optical transmitter comprising:
a wavelength tunable light source that outputs continuous wave light having a tunable wavelength;
an optical modulator;
a pump laser that outputs excitation light set to a predetermined output power;
an erbium-doped optical fiber amplifier (EDFA) that amplifies light output from the optical modulator by using the excitation light;
a variable optical attenuator (VOA) that has a variable attenuation; and
a controller that controls configured to control the wavelength tunable light source, the optical modulator, the pump laser, the EDFA, and the VOA to generate a main signal and an auxiliary signal,
the controller generating the main signal by:
causing the optical modulator to phase modulate the continuous wave light from the wavelength tunable light source and output phase-modulated light,
causing the EDFA to amplify the phase-modulated light from the optical modulator and output amplified light, and
causing the VOA to attenuate the amplified light from the EDFA and output attenuated light as the main signal, and the controller generating the auxiliary signal by:
causing the optical modulator to suspend phase modulation whereby the optical modulator outputs the continuous wave light from the wavelength tunable light source,
causing the pump laser to output intensity modulated light as the excitation light,
causing the EDFA to amplify the continuous wave light from the optical modulator by use of the intensity modulated light from the pump laser to output amplified, intensity-modulated light, and
causing the VOA to attenuate the amplified, intensity-modulated light from the EDFA to output variable attenuated, intensity-modulated light as the auxiliary signal,
wherein the controller causes the VOA to vary the attenuation of the amplified, intensity-modulated light between a first set value and a second set value larger than the first set value.

7. The optical transmitter of claim 5, wherein the auxiliary signal is a low speed signal relative to the main signal.

8. The optical transmitter of claim 6, wherein the auxiliary signal is a low speed signal relative to the main signal.

* * * * *